US006528155B1

(12) United States Patent
Kong et al.

(10) Patent No.: US 6,528,155 B1
(45) Date of Patent: Mar. 4, 2003

(54) OPAQUE POLYMERIC FILMS CAVITATED WITH SYNDIOTACTIC POLYSTYRENE

(75) Inventors: Dan-Cheng Kong, Fairport, NY (US); John A. Larter, Canandaigua, NY (US); Eldridge Milford Mount, III, Fairport, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/501,123

(22) Filed: Feb. 9, 2000

(51) Int. Cl.[7] .................................................. B32B 5/18
(52) U.S. Cl. ............................. 428/317.9; 428/319.3; 428/515; 428/516; 264/45.9; 264/173.15; 264/173.19
(58) Field of Search .................... 428/304.4, 317.9, 428/319.9, 500, 515, 516, 517; 264/173.15, 173.19, 49, 41, 459; 156/244.11, 244.24

(56) References Cited

U.S. PATENT DOCUMENTS

| | | | |
|---|---|---|---|
| 3,765,999 A | 10/1973 | Toyoda | 161/170 |
| 4,377,616 A | 3/1983 | Ashcraft et al. | 428/213 |
| 4,632,869 A | 12/1986 | Park et al. | 428/315.5 |
| 4,758,462 A | 7/1988 | Park et al. | 428/213 |
| 5,089,353 A | 2/1992 | Negi et al. | 428/518 |
| 5,194,324 A | 3/1993 | Poirier | 428/315.5 |
| 5,466,520 A | 11/1995 | Krallmann etal. | 428/323 |
| 5,502,133 A | 3/1996 | Ishihara et al. | 526/347 |
| 5,516,563 A | 5/1996 | Schumann et al. | 428/34.2 |
| 5,861,208 A | 1/1999 | Schreck | 428/327 |
| 5,866,246 A | 2/1999 | Schreck et al. | 428/327 |
| 5,914,375 A | 6/1999 | Tsai et al. | 526/128 |
| 6,143,408 A * | 11/2000 | Fujita | 428/355 R |
| 6,331,343 B1 * | 12/2001 | Perez et al. | 264/504 |

FOREIGN PATENT DOCUMENTS

| | | |
|---|---|---|
| EP | 695778 A2 | 6/1995 |
| WO | 00/58088 | 10/2000 |
| WO | 00/68301 | 11/2000 |
| WO | 00/69962 | 11/2000 |

* cited by examiner

Primary Examiner—D. Lawrence Tarazano
(74) Attorney, Agent, or Firm—Rick F. James; Keith A. Bell

(57) ABSTRACT

A method for producing an opaque polymeric film comprises:

(a) extruding a base layer comprising a polymeric matrix and at least one cavitating agent;

(b) coextruding at least one additional layer on at least one side of the base layer;

(c) cooling the coextruded multi-layer film; and then (d) orienting the film in at least the machine direction (MD);

wherein at least said base layer contains a syndiotactic polystyrene polymer, and wherein said syndiotactic polystyrene polymer is in the form of solid, non-hollow particles during the orienting step (d).

16 Claims, No Drawings

OPAQUE POLYMERIC FILMS CAVITATED WITH SYNDIOTACTIC POLYSTYRENE

FIELD OF THE INVENTION

The present invention relates to opaque polymeric films. More particularly, this invention relates to oriented opaque polymeric films prepared with a cavitating agent comprising a syndiotactic polystyrene polymer.

BACKGROUND OF THE INVENTION

Opaque polymeric films having a polyolefin core layer, e.g., of an oriented isotactic polypropylene (OPP), have been widely used in food and non-food packaging applications, because such films have desirable properties such as resistance to transmission of moisture, air, deleterious flavors, and the like, as well as outstanding mechanical properties.

During the production of these opaque polymeric films, cavitating agents may be used. In cases where polybutylene terephthalate (PBT) is used as the cavitating agent, extrusion plate out can be problem. In particular, PBT may degrade and build up in the film production equipment, forming deposits which further affect the flow patterns of molten polymer in the die. The use of PBT cavitating agents to prepare opaque polymeric films is described in U.S. Pat. No. 4,632,869 to Park et al.

As described in U.S. Pat. Nos. 5,866,246 and 5,861,208, particulate hollow bodies are prepared by dissolving polymer into a solvent and spraying the dissolved polymer into tiny particles. The remainder of the solvent is then removed by drying resulting in hollow particles of polymer. Cavitated film may be prepared by blending these particles with a polymer and extruding the blend, while maintaining the extrusion temperature below the melting or glass transition temperature of the hollow particles in order to retain the hollow shape of the particles. As a practical matter, however, the extrusion operation window is narrow and it is difficult to maintain the hollow particle shape, especially under the extrusion pressure encountered in commercial operation. In particular, uniform opacity is difficult to achieve in the processes described in U.S. Pat. Nos. 5,866,246 and 5,861,208.

SUMMARY OF THE INVENTION

There is provided an opaque polymeric film comprising:
(a) a base layer comprising a polymeric matrix and at least one cavitating agent; and
(b) at least one additional layer;
  wherein said cavitating agent comprises solid, non-hollow particles of a syndiotactic polystyrene polymer.

There is also provided a method for producing an opaque polymeric film comprising:
(a) extruding a base layer comprising a polymeric matrix and at least one cavitating agent;
(b) coextruding at least one additional layer on at least one side of the base layer;
(c) cooling the coextruded multi-layer film; and then
(d) orienting the film in at least the machine direction (MD);
  wherein said cavitating agent comprises a syndiotactic polystyrene polymer, and wherein said syndiotactic polystyrene polymer is in the form of solid, non-hollow particles during the orienting step (d).

Advantages of the present films include (1) reduced extrusion plate out during manufacture (2) uniform opacity, and (3) resistance to distortion caused by film crease.

DETAILED DESCRIPTION OF THE INVENTION

The base layer of the opaque polymeric film comprises a polymeric matrix, which may be selected from any of the polymers previously used in the art for such purpose. In many cases, such a polymer is a polyolefin having a melting point, for example, of at least about 150° C. and up to, for example, about 167° C. Preferably, the polyolefin of the base layer has a relatively high degree of crystallinity. A particularly desirable polyolefin as the base layer polymer is an isotactic polypropylene homopolymer having a crystallinity of, for example, about 89 to 99% (as measured by $^{13}$C NMR spectroscopy using meso pentads), a melting point of about 155 to about 165° C., and a melt index of about 0.5 to about 15 g/10 minutes (as measured by the standard ASTM D1238 methods).

Other suitable polymeric matrix materials for the base layer include, but are not limited to, syndiotactic polypropylene, ethylene-propylene copolymers, ethylenepropylene-butylene terpolymers, butylene-ethylene copolymers, functionally grafted copolymers, blends of polymers, etc.

At least one cavitating agent in the form of a dispersed phase is provided in the base layer polymeric matrix material before extrusion and orientation of the film. Such dispersed phase comprises particles of a syndiotactic polystyrene polymer. During film orientation, these particles are solid throughout and are not hollow, as distinguished from the hollow particles described in U.S. Pat. Nos. 5,866,246 and 5,861,208. This dispersed phase may also, optionally, comprise at least one additional cavitating agent.

The syndiotactic polystyrene polymer used as a cavitating agent has a high degree of crystallinity. As a result of this high degree of crystallinity, these polystyrene polymers have melting points, as opposed to glass transition temperatures, which are characteristic of amorphous polymers. The melting point of the present syndiotactic polystyrene polymer may be, for example, from about 240° C. to about 280° C.

The degree of syndiotacity may be measured by NMR techniques well known in the art, such as those described in U.S. Pat. No. 5,502,133. The present syndiotactic polystyrene polymers may have, for example, at least 92% racemic pentad (i.e. r-pendat) as measured by NMR spectroscopy.

The degree of syndiotacity can also be measured indirectly as a function of its lack of solubility in various solvents. In particular, amorphous polystryene tends to dissolve in certain solvents, whereas crystalline, syndiotactic polystyrene tends to be insoluble in such solvents. The present syndiotactic polystyrene polymer may be tested by a Soxlet extraction procedure using methylethyl ketone (MEK), as described in U.S. Pat. No. 5,914,375. The MEK-insoluble portion of the syndiotactic polystyrene homopolymer or copolymer may be, for example, greater than 90 wt %.

The present syndiotactic polymer may be a homopolymer or a copolymer of one or more substituted or unsubstituted styrene monomers. These monomers and comonomers and the amount thereof may be selected to result in the formation of a crystalline polymer with a melting point of at least 240° C. Examples of substituted styrenes include para-methylstyrene, meta-methylstyrene, ethylstyrene, butylstyrene, dimethylstyrene, chlorostyrene, bromostyrene, fluorostyrene, methoxystyrene and acetoxy methylstyrene. A preferred substituted styrene is para-methylstyrene.

An example of a particular polystyrene copolymer is a copolymer of para-methylstyrene and unsubstituted styrene. This copolymer may have a para-methylstyrene content of from 1 to 50 wt %, e.g., 1 to 20 wt %, e.g., 1 to 10 wt %, the remainder being unsubstituted styrene.

The optional additional cavitating agent may be a material having a melting point that is higher than the melting point of the polymeric matrix material of the base layer. The optional additional cavitating agent may also be immiscible with polymeric matrix material of the base layer. The optional additional cavitating agent may be any of those described in U.S. Pat. Nos. 4,377,616 and 4,632,869, the entire disclosures of which are incorporated herein by reference. Thus, the optional additional cavitating agent may be selected from a polymer, such as, for example, a polyester (e.g., PBT or polybutylene terephthalate), nylon (e.g., nylon-6), an acrylic resin, or an ethylene norborene copolymer; or an inorganic material, such as, glass, calcium carbonate, metal, or ceramic, or mixtures thereof.

The particle size of cavitating agents in the dispersed phase may be, for example, about 0.1 micron to about 5 microns, more preferably about 0.2 micron to about 2 microns. The dispersed phase may be present in the base layer in an amount of up to about 20 weight percent, for example, from about 5 to about 20 weight percent, based on the entire weight of the base layer.

The cavitating agent may dispersed in the polymeric matrix by blending the cavitating agent and matrix material at a temperature above the melting points of both the matrix material and the syndiotactic polystyrene polymer. This blending may take place in an extruder, such as a co-rotating, intermeshing twin screw extruder.

To preserve the structural integrity of the dispersed phase-containing base layer, a thin layer of the base layer polymeric matrix material without the dispersed phase may be coextruded on one or both sides of the dispersed phase-containing base layer polymeric matrix material. In this case, the total of the dispersed phase-containing polymer layer and the non-dispersed phase-containing layer(s) may be considered the overall base layer of the film. When such a polymer substrate is subjected to uniaxial or biaxial orientation, a cavity forms around the distributed dispersed phase moieties, providing a film having an opaque appearance.

The base layer of the film is of sufficient thickness to provide bulk properties, such as barrier, stiffness, etc. that are desired for product protection and good performance on packaging equipment. Preferably, the thickness ranges from about 50% to about 100%, based on the thickness of the entire film structure.

Additional layer(s) of the present invention may be any of the coextrudable, biaxially orientable film-forming resins known in the art. Such materials include, but are not limited to, syndiotactic polypropylene, low density polyethylene (LDPE), linear low density polyethylene (LLDPE), medium density polyethylene (MDPE), high density polyethylene (HDPE), ethylene-propylene copolymers, butylene-propylene copolymers, ethylene-butylene copolymers, ethylene-propylene-butylene terpolymers, ethylene-vinyl acetate copolymers, ethylene-vinyl alcohol copolymers, nylons, polymers grafted with functional groups, appropriate blends of these, and others known to those skilled in the art. Each additional layer preferably has a range in thickness from about 0.005 mil to about 0.15 mil, preferably from about 0.02 mil to about 0.10 mil.

There can be more than one additional layer coextruded on each side of the base layer. That is, one or more layers can be added to the surface of the base layer. Films having such a multi-layer structure are represented, in simplified form, as having a structure "ABCDE" where "C" represents a base layer, "B" represents an additional layer adjacent to the base layer and "A" represents a further additional layer or skin layer applied to the outer surface of layer "B." In such a film structure, the additional layer "B" can be referred to as a "tie-layer" or an "intermediate layer." Layers "A" and "B" can be the same or different. Similarly, "D" and "E" represent additional layers on the other side of the base layer, and they may be the same or different. Layers "B" and "D" may be the same or different, and layers "A" and "E" may be the same or different. Additionally, structures containing more than five layers are contemplated, e.g. seven, nine, or more layers.

In order to modify or enhance certain properties of the multi-layer films of the present invention for specific end-uses, it is possible for one or more of the layers to contain appropriate additives in effective amounts. Preferred additives include, but are not limited to anti-blocks, anti-static agents, coefficient of friction (COF) modifiers, processing aids, colorants, clarifiers, and other additives known to those skilled in the art.

Also, one or more of the exposed layers of the multi-layer films of the present invention can be surface-treated to render the films receptive to printing inks, adhesives and/or coatings. The surface treatment can be carried out by any method known in the art such as corona discharge treatment or flame treatment.

Optionally, a coating may be applied to one or both of the exposed surfaces of the outermost layers of the film. Prior to application of the coating material, the film may be surface treated or may be primed with a primer layer. Appropriate coatings contemplated include acrylic coatings such as those described in U.S. Pat. Nos. 3,753,769 and 4,865,908, both of which are incorporated herein by reference, and 20 PVDC coatings such as those described in U.S. Pat. No. 4,214,039; 4,447,494; 4,961,992; 5,019,447 and 5,057,177, all of which are incorporated herein by reference. A vinyl alcohol polymer may also be used as a coating composition, such as VINOL 325.

Appropriate primer materials are poly(ethyleneimine), epoxy primers, and the like.

The outer surface of the film is preferably treated as noted above to increase its surface energy and therefore insure that the coating layer will be strongly adherent thereto thereby reducing the possibility of the coating peeling or being stripped from the film. This treatment can be accomplished employing known techniques, such as, for example, film chlorination, i.e., exposure of the film surface to aqueous chlorine, treatment with oxidizing agents such as chromic acid, hot air or steam treatment, and the like. Although any of these techniques are effectively employed to pretreat the film surface, a particularly desirable method of treatment is the so-called corona treatment method which comprises exposing the film surface to a high voltage corona discharge while passing the film between a pair of spaced electrodes. After corona treatment of the film surface, the coating composition is then applied thereto.

The exposed treated or untreated surfaces of the film may have applied to them coating compositions, as mentioned above, and/or substrates such as another polymer film or laminate; a metal foil such as aluminum foil; cellulosic webs, e.g. numerous varieties of paper such as corrugated paperboard, craft paper, glassine, cartonboard; nonwoven tissue, e.g., spunbonded polyolefin fiber, melt-blown microfibers; a metallizing layer, etc. The application may employ a suitable adhesive, e.g., a hot melt adhesive such as low density polyethylene, ethylene-methacrylate copolymer, water-based adhesives such as polyvinylidene chloride latex, and the like.

The extruded film can be stretched in the machine direction, coated with the coating composition and then stretched perpendicularly in the transverse direction.

In yet another embodiment, the coating can be carried out after biaxial orientation is completed.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). Generally, the coating comprises 1 to 25 wt %, preferably 7 to 15 wt % of the entire coated film composition. The coating on the film is subsequently dried by hot air, radiant heat or by any other convenient means.

The film of the invention may have a total thickness ranging from about 0.2 mil to about 5 mils, specifically from about 0.4 mil to about 2.5 mils. The thickness relationship of the layers can be important. For example, the base layer may constitute about 40 to about 100 percent of the total film thickness, any intermediate layers may have a thickness ranging from about 0 to about 30 percent of the total film thickness while any outer skin layers may range from about 0 to about 10 percent of the total film thickness.

Multi-layer films may be prepared employing commercially available systems for coextrusion.

It is preferred that all layers of the multi-layer film structures of the present invention be coextruded. Thereafter, the film is biaxially oriented. Specifically, the polymers are brought to the molten state and coextruded from a conventional extruder through a flat sheet die, the melt streams are combined in an adapter prior to being extruded from the die or within the die. After leaving the die, the multi-layer web is chilled and the quenched web is reheated and oriented. Preferably, the film is oriented by biaxially stretching the film. The film can be oriented by stretching from about 3 to about 11 times in the machine direction (MD) at temperatures ranging from about 105° C. to about 150° C. and from about 3 to about 12 times in the transverse direction (TD) at temperatures ranging from about 150° C. to about 165° C.

The particles of syndiotactic polystyrene polymer remain rigid and essentially non-deformable during the film orientation process. This particle rigidity is believed to facilitate micro-fibrilation during the orientation process. For example, less stretching in the machine direction is needed to achieve an equivalent amount of micro-fibrilation, as compared to films including less rigid cavitating agents. Micro-fibrilation may be observed by scanning electron microscopy.

The elongation to break for the matrix polymer is believed to be reduced by the present rigid polymer dispersion. Therefore, it is believed that the inclusion of a rigid polymer dispersion in a polymer matrix accelerates microscale fracture of the matrix polymer, which causes inhomogeneous light transmission (i.e. light scattering) through the film or opaque appearance.

Films which are cavitated with PBT tend to have a distorted appearance when such films are creased or folded. In particular, a honeycomb appearance may show up on the surface of such creased films. However, the present films, cavitated with syndiotactic polystyrene polymer, are more resistant to distortion caused by folding or creasing of the film.

In all of the Examples 1–9 which follow, three-layer oriented films, each having a skin layer A, a core layer B and a skin layer C, were produced. The core layer B in Examples 1–4 included a syndiotactic polystyrene homopolymer dispersed in a polypropylene matrix. The syndiotactic polystyrene homopolymer had a melting point of 270° C. and a syndiotacity of 98% in terms of r-pentad measured by NMR spectroscopy. The polypropylene in each core layer B was the isotactic polypropylene, PP 3371, sold by Fina Oil and Chemical Company. The components of the core layer B were extruded at a temperature of 280° C.

The skin layer A in each of Examples 1–3 and 5–9 and skin layer C in each of Examples 1–9 were made from EP 8573, which is a copolymer of ethylene and propylene sold by Fina Oil and Chemical Company.

In all of the Examples 1–9, the three layers were coextruded and stretched 5.2 times in the machine direction (MD) and 8 times in the transverse direction (TD). The MD orientation temperature ranged from 95° C. to 100° C., and the TD orientation temperature ranged from 160° C. to 170° C. In Examples 1–4, skin layers A and C were each 5 gauge units in thickness, and core layer B was 90 gauge units in thickness.

EXAMPLE 1

Core layer B was made from a blend of 95 wt % isotactic polypropylene with 5 wt % syndiotactic polystyrene.

EXAMPLE 2

Core layer B was made from a blend of 91 wt % isotactic polypropylene with 5 wt % syndiotactic polystyrene, 2 wt % linear low density polyethylene (LLDPE) and 2 wt % titanium dioxide.

EXAMPLE 3

Core layer B was made from a blend of 92.5 wt % isotactic polypropylene with 7.5 wt % syndiotactic polystyrene.

EXAMPLE 4

Skin layer A was made from a blend of 70 wt % polypropylene, PP 3571, sold by Fina Oil and Chemical Company and 30 wt % linear low density polyethylene, Dowlex 2042A, sold by the Dow Chemical Company. Core layer B was made from a blend of 92.5 wt % isotactic polypropylene with 7.5 wt % syndiotactic polystyrene.

In Examples 5–9 which follow, the core layer B included a syndiotactic copolymer of styrene and para-methyl styrene dispersed in a polypropylene matrix. The syndiotactic copolymer of styrene and para-methyl styrene had a melting point of 250° C. and a syndiotacity of 98% in terms of r-pentad measured by NMR spectroscopy. This copolymer included about 95 wt % styrene and about 5 wt % para-methyl styrene.

In Examples 5–9, skin layers A and C were each 1 µm in thickness, and core layer B was 23 µm in thickness.

EXAMPLE 5

A master batch of polymer pellets were compounded in a co-rotating, intermeshing twin screw extruder. The polymer pellets were a mixture of isotactic polypropylene pellets (80 parts by weight) and pellets of a syndiotactic copolymer of styrene and para-methyl styrene (20 parts by weight). Virgin isotactic polypropylene of the same type employed in the master batch was blended with the master batch resins to make a final ratio of 92.5 parts by weight of polypropylene to 7.5 parts by weight of the syndiotactic copolymer of styrene and para-methyl styrene.

The resulting film had an opacity of 28% light transmission.

EXAMPLE 6

In the manner described in Example 5, a master batch was prepared with isotactic polypropylene and a syndiotactic copolymer of styrene and para-methyl styrene. Virgin isotactic polypropylene of the same type employed in the master batch, as well as a polybutylene terephthalate resin, were blended with the master batch resins to make a final ratio of 92.25 parts by weight of polypropylene to 3.75 parts by weight of the syndiotactic copolymer of styrene and para-methyl styrene and 4.0 parts by weight of polybutylene terephthalate.

The resulting film had an opacity of 26% light transmission.

EXAMPLE 7

In the manner described in Example 5, a master batch was prepared with isotactic polypropylene and a syndiotactic copolymer of styrene and para-methyl styrene. Virgin isotactic polypropylene of the same type employed in the master batch, as well as a nylon-6 resin, were blended with the master batch resins to make a final ratio of 92.25 parts by weight of polypropylene to 3.75 parts by weight of the syndiotactic copolymer of styrene and para-methyl styrene and 4.0 parts by weight of nylons-6.

The resulting film had an opacity of 28% light transmission.

EXAMPLE 8

In the manner described in Example 5, a master batch was prepared with isotactic polypropylene and a syndiotactic copolymer of styrene and para-methyl styrene. Virgin isotactic polypropylene of the same type employed in the master batch, as well as an ethylene norborene copolymer, were blended with the master batch resins to make a final ratio of 92.75 parts by weight of polypropylene to 5.25 parts by weight of the syndiotactic copolymer of styrene and para-methyl styrene and 2.0 parts by weight of ethylene norborene copolymer available from Hoechst Celanese.

The resulting film had an opacity of 26% light transmission.

EXAMPLE 9

In the manner described in Example 5, a master batch was prepared with isotactic polypropylene and a syndiotactic copolymer of styrene and para-methyl styrene. Virgin isotactic polypropylene of the same type employed in the master batch, as well as $CaCO_3$, were blended with the master batch resins to make a final ratio of 92.35 parts by weight of polypropylene to 5.25 parts by weight of the syndiotactic copolymer of styrene and para-methyl styrene and 2.4 parts by weight of $CaCO_3$.

The resulting film had an opacity of 30% light transmission.

What is claimed is:

1. An opaque polymeric film comprising:

(a) a base layer comprising a polyolefin matrix and at least one cavitating agent; and (b) at least one additional layer;

wherein said cavitating agent comprises solid, non-hollow particles of a syndiotactic polystyrene polymer, and said syndiotactic polystyrene polymer has a syndiotacticity of at least 92% racemic pentad, as measured by NMR spectroscopy.

2. A film according to claim 1, wherein said syndiotactic polystyrene polymer is a homopolymer of unsubstituted styrene or a copolymer of para-methylstyrene and unsubstituted styrene.

3. A film according to claim 1 further comprising at least one additional cavitating agent selected from the group consisting of polyester, nylon, an acrylic resin, an ethylene norborene copolymer, glass, calcium carbonate, metal, and ceramic.

4. A film according to claim 1, wherein said polyolefin matrix is a polypropylene matrix.

5. A film according to claim 1, wherein said syndiotactic polystyrene polymer is a present in an amount of from about 5 to about 20 weight percent, based on the total weight of the base layer.

6. A film according to claim 1, wherein said polyolefin is selected from the group consisting of isotactic polypropylene, syndiotactic polypropylene, an ethylene-propylene copolymer, an ethylene-propylene-butylene terpolymer and a butylene-ethylene copolymer.

7. A film according to claim 1, wherein said syndiotactic polystyrene polymer is a syndiotactic polystyrene copolymer.

8. A film according to claim 7, wherein said syndiotactic polystyrene copolymer is a copolymer of para-methylstyrene and unsubstituted styrene.

9. A method for producing an opaque polymeric film comprising:

(a) extruding a base layer comprising a polyolefin matrix and at least one cavitating agent;

(b) coextruding at least one additional layer on at least one side of the base layer;

(c) cooling the coextruded multi-layer film; and then (d) orienting the film in at least the machine direction (MD);

wherein said cavitating agent comprises a syndiotactic polystyrene polymer, said syndiotactic polystyrene polymer is in the form of solid, non-hollow particles during the orienting step (d), and said syndiotactic polystyrene polymer has a syndiotacticity of at least 92% racemic pentad, as measured by NMR spectroscopy.

10. A method according to claim 9, wherein said syndiotactic polystyrene polymer is a homopolymer of unsubstituted styrene or a copolymer of para-methylstyrene and unsubstituted styrene.

11. A method according to claim 9 further comprising at least one additional cavitating agent selected from the group consisting of polyester, nylon, an acrylic resin, an ethylene norborene copolymer, glass, calcium carbonate, metal, and ceramic.

12. A method according to claim 9, wherein said polymeric matrix is a polypropylene matrix.

13. A method according to claim 9, wherein said syndiotactic polystyrene polymer is present in an amount from about 5 to about 20 weight percent, based on the total weight of the base layer.

14. A method according to claim 9, wherein said polyolefin is selected from the group consisting of isotactic polypropylene, syndiotactic polypropylene, an ethylene-propylene copolymer, an ethylene-propylene-butylene terpolymer and a butylene-ethylene copolymer.

15. A method according to claim 9, wherein said syndiotactic polystyrene polymer is a syndiotactic polystyrene copolymer.

16. A method according to claim 15, wherein said syndiotactic polystyrene copolymer is a copolymer of para-methylstyrene and unsubstituted styrene.

* * * * *